United States Patent
Togashi et al.

(10) Patent No.: US 6,538,458 B2
(45) Date of Patent: Mar. 25, 2003

(54) ELECTROSTATIC CAPACITANCE PROBE DEVICE AND DISPLACEMENT MEASURING CIRCUIT

(75) Inventors: Michihiko Togashi, Kanagawa (JP); Osamu Kawatoko, Kanagawa (JP)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 09/915,855

(22) Filed: Jul. 26, 2001

(65) Prior Publication Data

US 2002/0011850 A1 Jan. 31, 2002

(30) Foreign Application Priority Data

Jul. 28, 2000 (JP) ........................................ 2000-229588

(51) Int. Cl.$^7$ .......................... G01R 27/26; H01L 21/66; H01L 21/461
(52) U.S. Cl. ........................ 324/662; 324/690; 324/762; 324/672; 438/17; 438/719
(58) Field of Search ................................. 324/662, 658, 324/690, 176, 686, 457, 757, 762, 672; 216/6; 438/17, 18, 719

(56) References Cited

U.S. PATENT DOCUMENTS

| | | | |
|---|---|---|---|
| 4,206,401 A | | 6/1980 | Meyer |
| 4,625,176 A | * | 11/1986 | Champion et al. .......... 324/457 |
| 5,045,798 A | * | 9/1991 | Hendrick .................... 324/685 |
| 5,077,635 A | * | 12/1991 | Bollhagen et al. .......... 318/662 |
| 5,212,992 A | | 5/1993 | Calhoun et al. |
| 5,438,275 A | * | 8/1995 | Fado et al. ................. 324/662 |
| 5,512,836 A | * | 4/1996 | Chen et al. ................. 324/663 |
| 6,142,632 A | * | 11/2000 | Inatome ...................... 324/688 |
| 6,300,756 B2 | * | 10/2001 | Sturm et al. ............. 324/158.1 |

FOREIGN PATENT DOCUMENTS

JP 11-233794 8/1999

* cited by examiner

*Primary Examiner*—Christine Oda
*Assistant Examiner*—Anjan K. Deb
(74) *Attorney, Agent, or Firm*—Rankin, Hill, Porter & Clark LLP

(57) ABSTRACT

There is provided a small, high-performance electrostatic capacitance probe device and a displacement measuring circuit using the probe device. The electrostatic capacitance probe device is formed from a processed, stacked substrate with a silicon substrate/insulator/silicon substrate structure. A support substrate (1) is formed through a process of etching the first silicon substrate to remove undesired portions. A probe (2) is formed by etching the second silicon substrate and provided with a proximal electrode portion (2b) secured on the support substrate (1) by means of the insulator (11) and a beam portion (2a) separated from the support substrate (1) by removing the insulator (11) from beneath the beam portion (2a). A pair of detecting electrodes (3, 4) is formed by etching the second silicon substrate, secured on the support substrate (1) by the insulator (1) and located to sandwich a portion of the beam portion (2a) close to the proximal electrode portion (2b). These electrodes have sides capacitively coupled with sides of the beam portion (2a). Deformation of the tip of the probe (2) caused from contact with a work is detected from a differential capacitance variation between the probe (2) and the pair of detecting electrodes (3, 4).

12 Claims, 6 Drawing Sheets

(a)

(b)

ELECTROSTATIC CAPACITANCE PROBE DEVICE AND DISPLACEMENT MEASURING CIRCUIT

BACKGROUND OF THE INVENTION

1. Field of the Invention

The present invention relates to a small electrostatic capacitance probe device for use in measurement of micro-bore diameter and measurement of surface roughness and to a displacement measuring circuit using the probe device.

2. Description of the Related Art

Recent developments in precise machining technologies permit processing of micro-bores (or holes) with inner diameters of 100 µm or less to be applied in many fields. These micro-bores occupy important elements in actual products while the conventional bore size evaluation is already difficult at a stage of sub-millimeter in practice. Therefore, a precise evaluation technology for micro-bore diameters is required.

For such the requirement, there is a remarkable technology for producing a micro-cantilever structure using fine patterning technologies for silicon. This silicon cantilever structure can be employed as an electrical switch, that is, a displacement probe for detecting electrical conduction when it contacts with a work to be measured.

A contact probe using the above-described silicon cantilever structure is unstable in electrical conduction and difficult to perform a high precise measurement because a contact portion is unstable.

SUMMARY OF THE INVENTION

The present invention has been made in consideration of the above situation and accordingly has an object to provide a small, high-performance electrostatic capacitance probe device and a displacement measuring circuit using the probe device.

The present invention provides an electrostatic capacitance probe device formed from a processed, stacked substrate, which includes a first semiconductor substrate and a second semiconductor substrate stacked thereon via an insulator. The probe device comprises a support substrate formed by etching the first semiconductor substrate to remove undesired portions; a probe formed by etching the second semiconductor substrate and provided with a proximal electrode portion secured on the support substrate by means of the insulator and a beam portion separated from the support substrate by removing the insulator from beneath the beam portion; and a pair of detecting electrodes formed by etching the second semiconductor substrate, secured on the support substrate by means of the insulator, located to sandwich a part of the beam portion close to the proximal electrode portion, and having sides capacitively coupled with sides of the beam portion. Deformation of the tip of the probe caused from contact with a work is detected from a differential capacitance variation between the probe and the pair of detecting electrodes.

The electrostatic capacitance probe device according to the present invention employs a stacked substrate with a semiconductor substrate/insulator/semiconductor substrate structure, which is processed to integrally form a probe having an end secured on a support substrate and a pair of detecting electrodes capacitively coupled with sides of the probe. Conventional fine patterning technologies for semiconductor devices can be utilized for processing the stacked substrate to obtain a small probe device. The use of lateral etching of a ground insulator during the process of the substrate can remove the ground insulator from beneath the elongated beam portion of the probe while remaining the ground insulator beneath the proximal electrode portion with a larger area. Thus, the probe except for the proximal electrode portion can be easily processed in a state floating from the support substrate.

In the present invention, the principle of probe contact detection is to detect decomposition of the tip (distortion of the beam portion) of the probe caused from contact with a work to be measured. The decomposition can be detected from a differential capacitance variation between the probe and the pair of the detecting electrodes (that is, between the proximal electrode portion and the pair of the detecting electrodes). Such the differential processing allows a high precise contact detection to be performed without any affection from capacitance variations due to temperature variations and from variations of absolute electrostatic capacitance values due to variable manufacture conditions. Therefore, a small, high-performance probe device optimal for measurement of a micro-bore diameter can be obtained.

Preferably, the electrostatic capacitance probe device according to the present invention may further comprise an auxiliary electrode portion formed by etching the second semiconductor substrate, secured on the support substrate by means of the insulator, and having sides capacitively coupled with sides of the proximal electrode portion. A capacitor between the auxiliary electrode portion and the proximal electrode portion may be employed as a negative feedback capacitor for a displacement measuring circuit arrangement.

Preferably, capacitive coupling portions between the pair of detecting electrodes and the beam portion, as well as a capacitive coupling portion between the auxiliary electrode portion and the proximal electrode portion, may be formed in the form of interdigitating fingers. This arrangement increases coupling capacitance even in a small device and allows for contact (displacement) detection with high precise and reduced affection from noises.

A displacement measuring instrument may be configured using the above electrostatic capacitance probe device. In this case, the displacement measuring instrument comprises an alternating signal source for complementarily driving the pair of detecting electrodes; and a signal processing circuit for detecting an amplitude value of a signal appeared on the proximal electrode portion.

A displacement measuring instrument may also be configured using the electrostatic capacitance probe device having the auxiliary electrode portion. In this case, the displacement measuring instrument comprises an alternating signal source for complementarily driving the pair of detecting electrodes; a signal processing circuit for detecting an amplitude value of a signal appeared on the proximal electrode portion; and a negative feedback circuit for taking an output from the signal processing circuit through an analogue switch in synchronization with the alternating signal source and feeding it to the auxiliary electrode.

Other features and advantages of the invention will be apparent from the following description of the preferred embodiments thereof.

BRIEF DESCRIPTION OF THE DRAWINGS

The present invention will be more fully understood from the following detailed description with reference to the accompanying drawings in which.

DETAILED DESCRIPTION OF THE PREFERRED EMBODIMENTS

An electrostatic capacitance probe device according to the present invention will be described below with reference to drawings.

Figure 1:
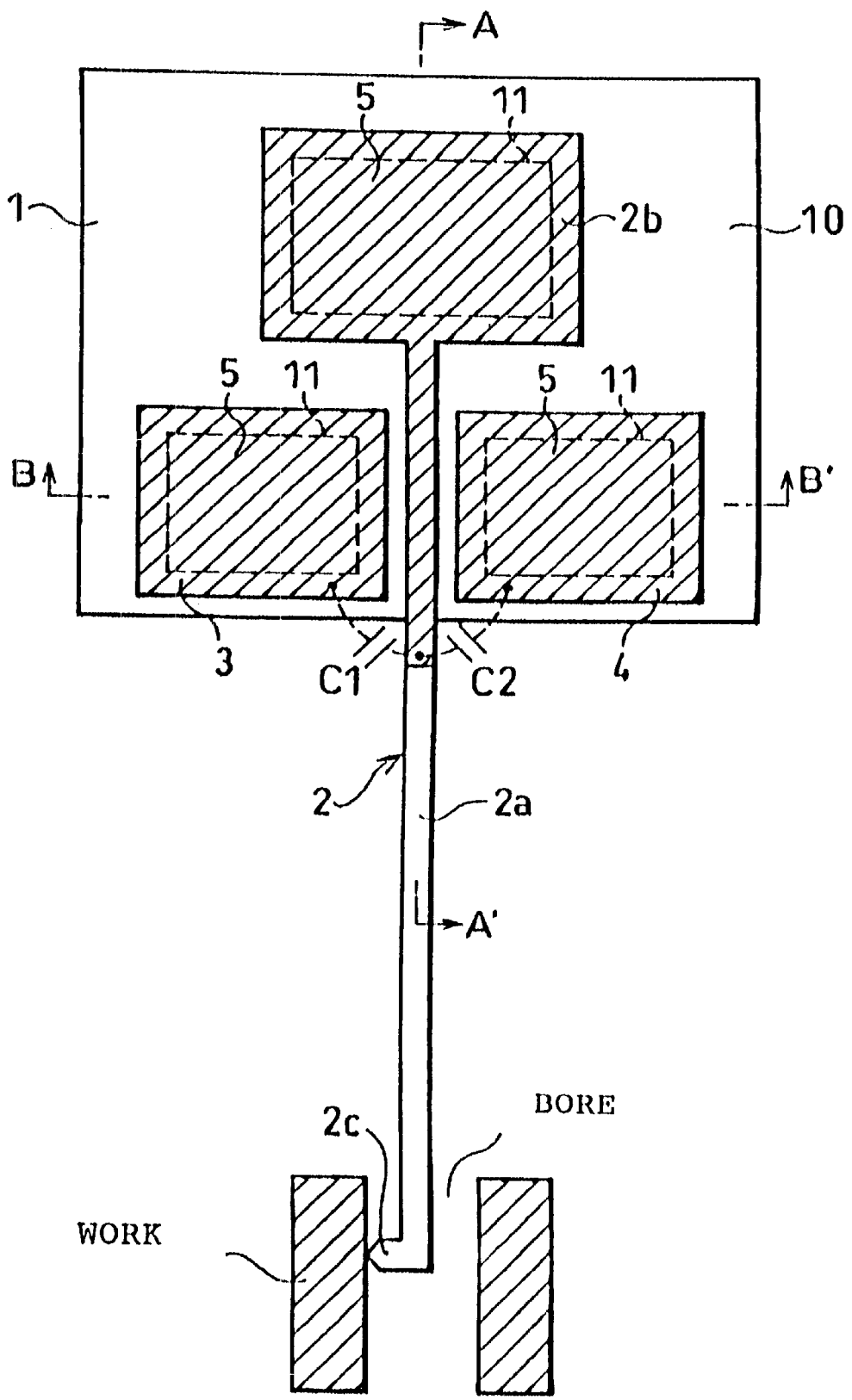
FIG. 1 is a plan view of a probe device according to the present invention.

FIG. 1 is a plan view showing a fundamental arrangement of the electrostatic capacitance probe device and FIGS. 2A–2B are cross-sectional views taken along A-A' and B-B' in FIG. 1. This probe device is formed through a process of etching a stacked substrate having a structure of semiconductor substrate/insulator/semiconductor substrate. A specific stacked substrate comprises a SOI (silicon on insulator) substrate, as shown in FIG. 3, which includes a first silicon substrate 10 and a second silicon substrate 12 adhered thereto via an insulator 11 such as $SiO_2$. The second silicon substrate 12 may be adjusted to have a desired thickness after adhesion, if required, because it is employed as a probe body.

A support substrate 1 in the probe device is formed through one lithography process of etching the first silicon substrate 10 into a certain size. The probe 2 is formed through a process of etching the second silicon substrate 12. Specifically, the probe is patterned through one lithography process to have an elongated beam portion 2a and a proximal electrode portion 2b secured on the support substrate 1 as shown in FIG. 1. The second silicon substrate 12 can be etched by RIE (reactive ion etching). Thereafter, the insulator 11 can be etched by an isotropic etching. In this case, the insulator 11 backs off its side but remains under the proximal electrode portion 2b. To the contrary, the ground insulator 11 is completely removed from beneath the elongated beam portion 2a.

Figure 2:
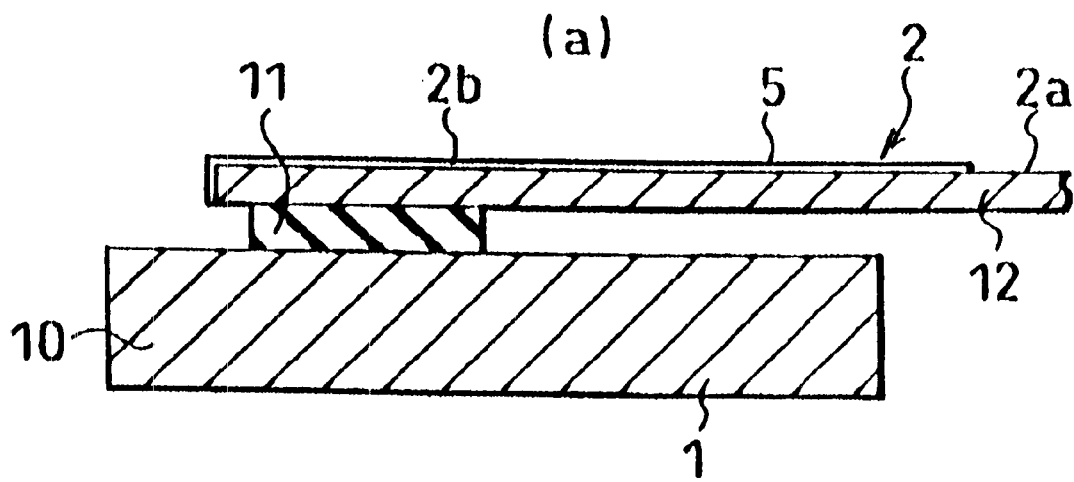
FIG. 2 shows cross-sectional views taken along A-A' and B-B' in FIG. 1.
Figure 2:
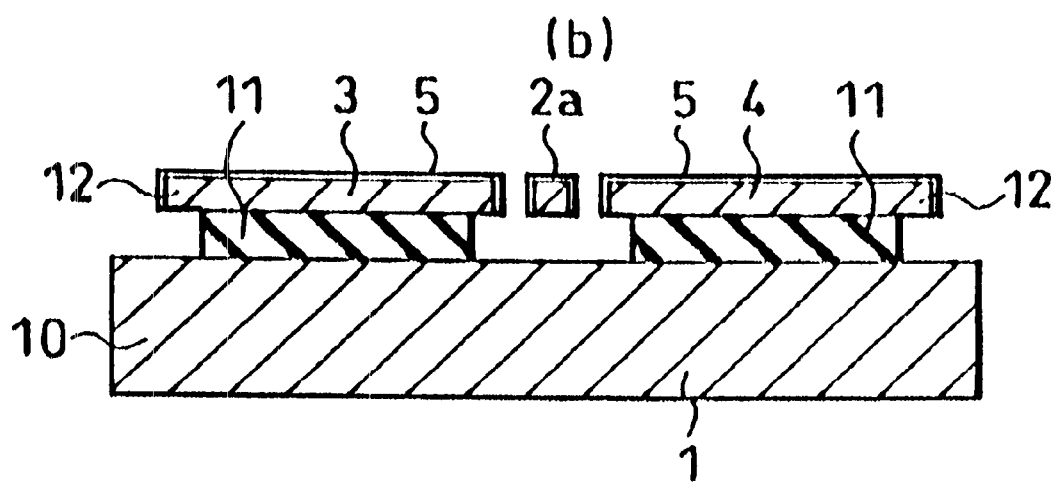
Figure 3:
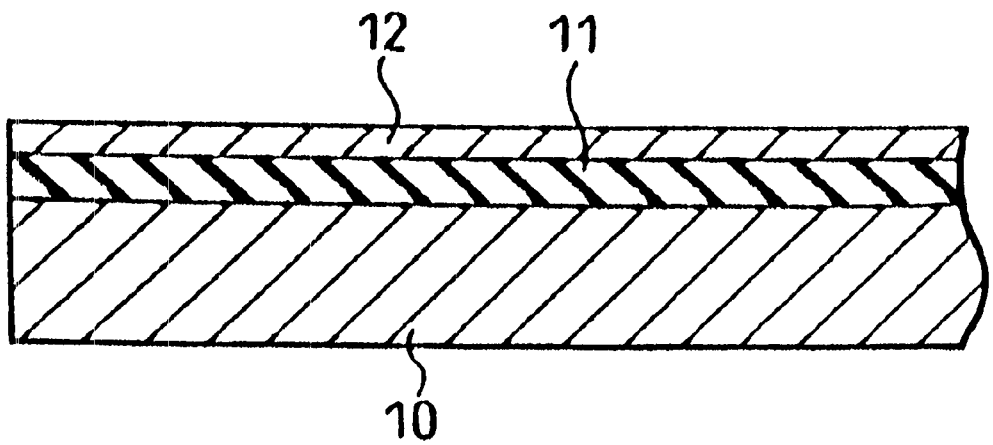
FIG. 3 is cross-sectional view of a stacked substrate used to produce the probe device.

As a result, the proximal electrode portion 2b is fixedly supported on the support substrate 1 by means of the insulator 11, as shown in FIG. 2, while the elongated beam portion 2a floats above the support substrate 1. The probe tip 2c is patterned to be a hook-shaped contact. In the probe dimensions, the beam portion 2a has a length of about 4 mm and a width of about 30 $\mu$m, for example.

A pair of detecting electrodes 3 and 4 is arranged on the support substrate 1 symmetrically, sandwiching the beam portion 2a of the probe 2, in the vicinity of the proximal electrode portion 2b. These detecting electrodes 3, 4 are formed through a process of etching the second silicon substrate 12 in the same lithography and etching processes as for the probe 2. The insulator 11 remains on the ground beneath the detecting electrodes 3, 4 similar to the proximal electrode portion 2b of the probe 2. Therefore, the detecting electrodes 3, 4 are secured on the support substrate 1 by means of the insulator 11.

The above-described etching of the second silicon substrate 12 can integrally form the beam portion 2a and proximal electrode portion 2b of the probe 2 and the pair of the detecting electrodes 3, 4. A conductor film 5 such as an Au metallic film 5 is formed over surfaces and sides of the beam portion 2a and proximal electrode portion 2b of the probe 2 and the pair of the detecting electrodes 3, 4 on the support substrate 1.

The sides of the pair of the detecting electrodes 3, 4 are opposed to and spaced the same air gap from sides of the beam portion 2a of the probe 2. As a result, the pair of the detecting electrodes 3, 4 capacitively couple to the probe 2 through capacitors C1, C2 as shown in FIG. 1. The capacitors C1, C2 have the same capacitance so long as the probe 2 is not deformed.

The principle of displacement (contact) detection using the electrostatic capacitance probe device thus configured will be described next. As shown in FIG. 1, the probe 2 can be employed to measure a diameter of a bore in a work to be measured, for example, with inserting the tip 2c into the bore. When the tip 2c contacts a wall inside the bore, the beam portion 2a flexes. The deformation of the beam portion 2a in a plane parallel with the surface of the support substrate 1 varies gaps between the beam portion 2a and the detecting electrodes 3, 4, one smaller and the other larger, and causes a differential capacitance variation between the capacitors C1, C2. Detection of this differential capacitance variation leads to contact detection.

A specific contact detection, though it is detailed later, is performed by driving the pair of the detecting electrodes 3 and 4 complementarily with an alternating signal and processing a signal appeared on the proximal electrode portion 2b. Unless the probe 2 contacts the work, the capacitors C1, C2 have the same capacitance and therefore no signal appears on the proximal electrode portion 2b. Once the probe 2 contacts the work, the capacitors have a relation of C1<C2 and a signal with a level variable in response to the capacitance variation appears on the proximal electrode portion 2b. Accordingly, detection of the signal amplitude leads to contact detection.

The probe device is produced as described above through the use of fine patterning technologies for semiconductor devices to etch a stacked structure of semiconductor substrate/insulator/semiconductor substrate. Therefore, the probe device can be downsized to micro-dimensions and utilized as an unprecedented small probe capable of measuring micro-bores. In addition, it is detected that the capacitors C1 and C2 are equal to each other in a stationary state of the device but are unbalanced capacitively when the probe contacts a work. Accordingly, even if the absolute capacitance values of the capacitors C1 and C2 vary due to variable manufacture conditions and temperatures, the sensitivity is not affected but rather becomes higher because a differential capacitance variation is detected.

Figure 4:
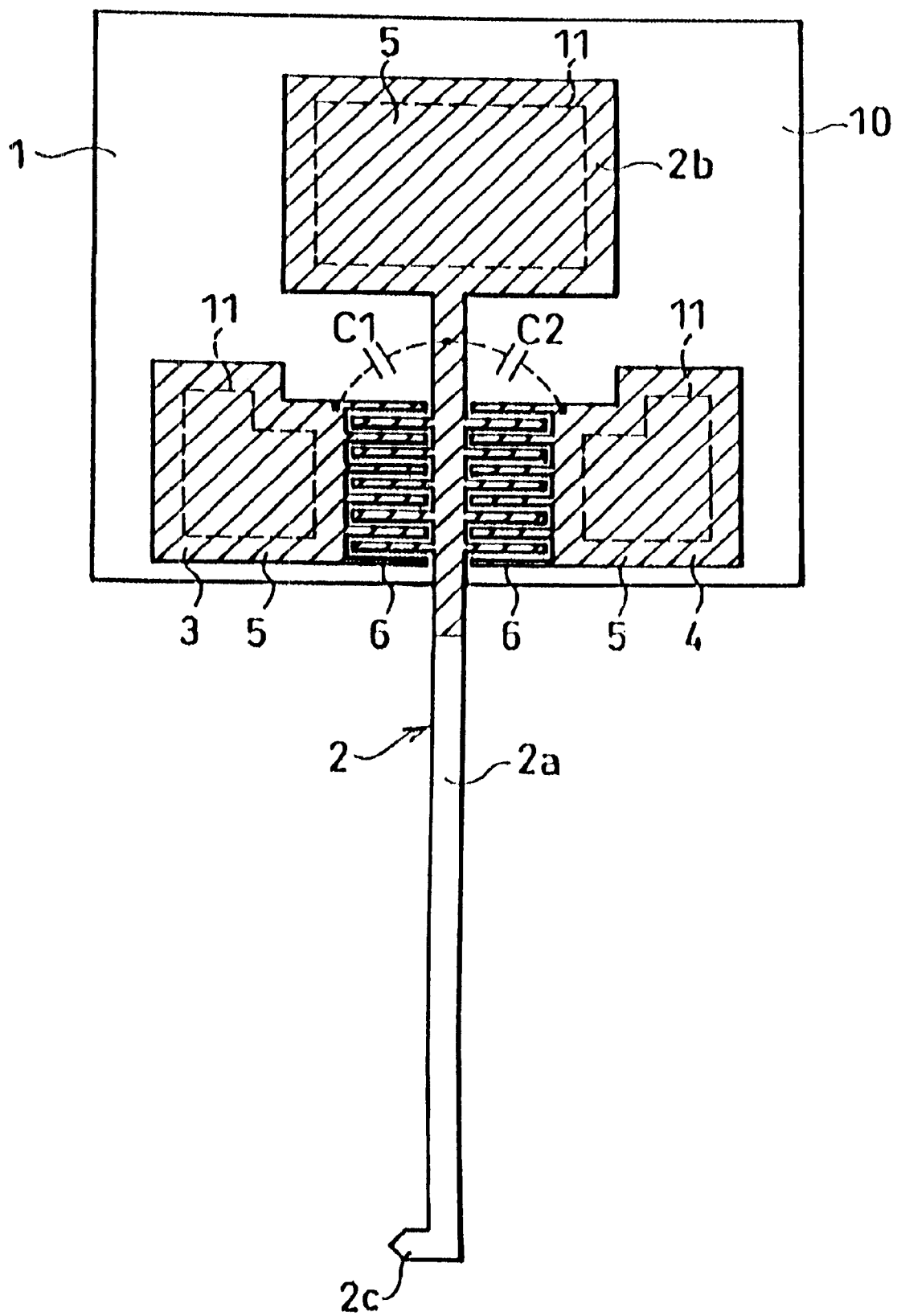
FIG. 4 is a plan view of an alternative of the probe device in FIG. 1.
Figure 5:
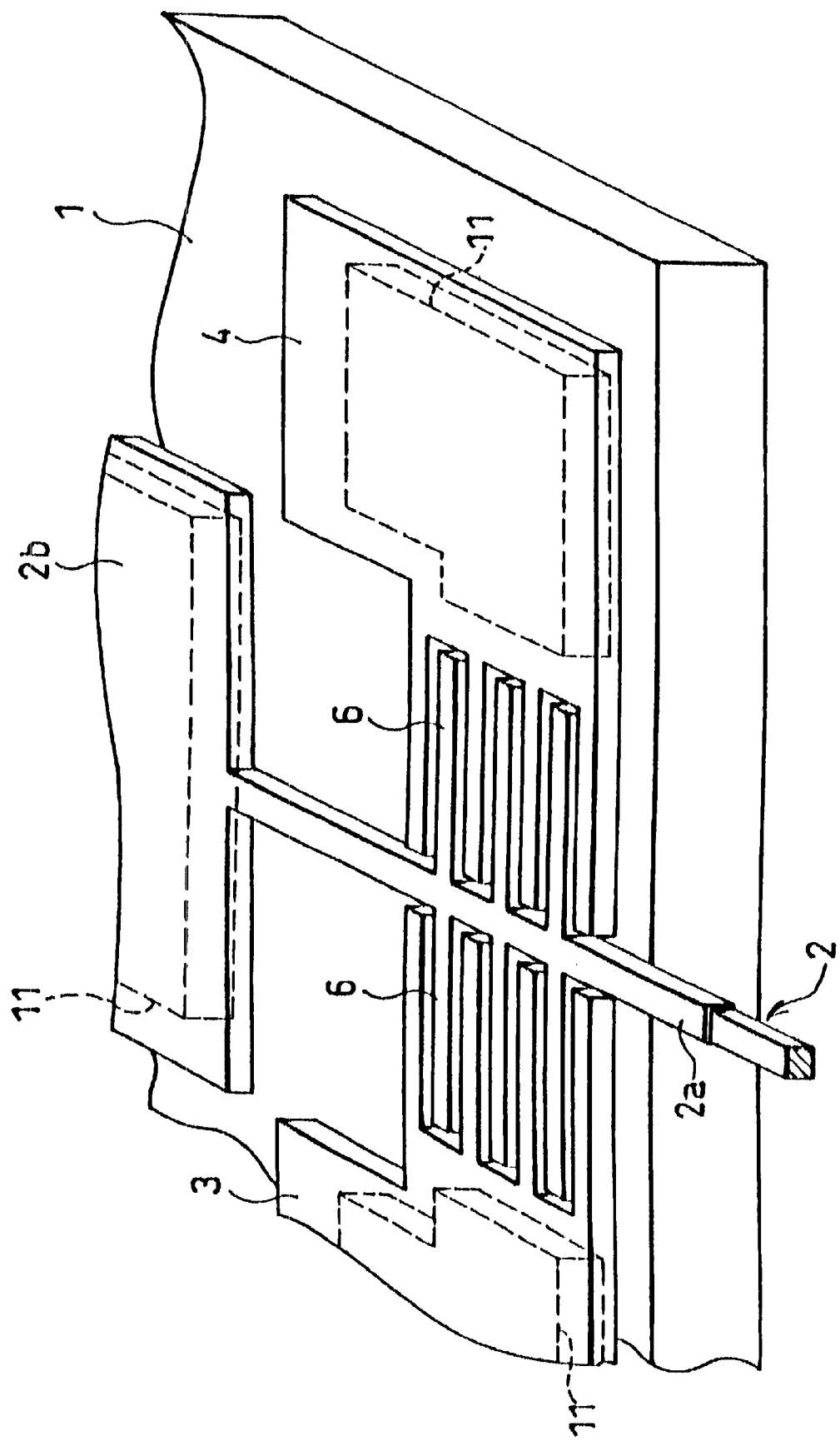
FIG. 5 is a perspective view of the main part of the same probe device.

FIG. 4 shows an alternative of the arrangement of FIG. 1 and FIG. 5 is a perspective view of the main part thereof, in which the same parts as those in FIG. 1 are denoted with the same numeral references and their detailed descriptions are to be omitted. In the arrangement of FIGS. 4–5, between the pair of detecting electrodes 3, 4 and the beam portion of the probe 2, interdigital electrode portions 6,6 are formed in the form of interdigitating fingers. The same manufacturing method as that used in FIG. 1 can be applied to this alternative. From beneath the interdigital electrode portion 6, the ground insulator is removed.

In the above arrangement, capacitance of the capacitors C1, C2 between the detecting electrodes 3, 4 and the beam portion 2a become larger than those in FIG. 1. Accordingly, there is an advantage because it hardly suffers from stray capacitance.

Figure 6:
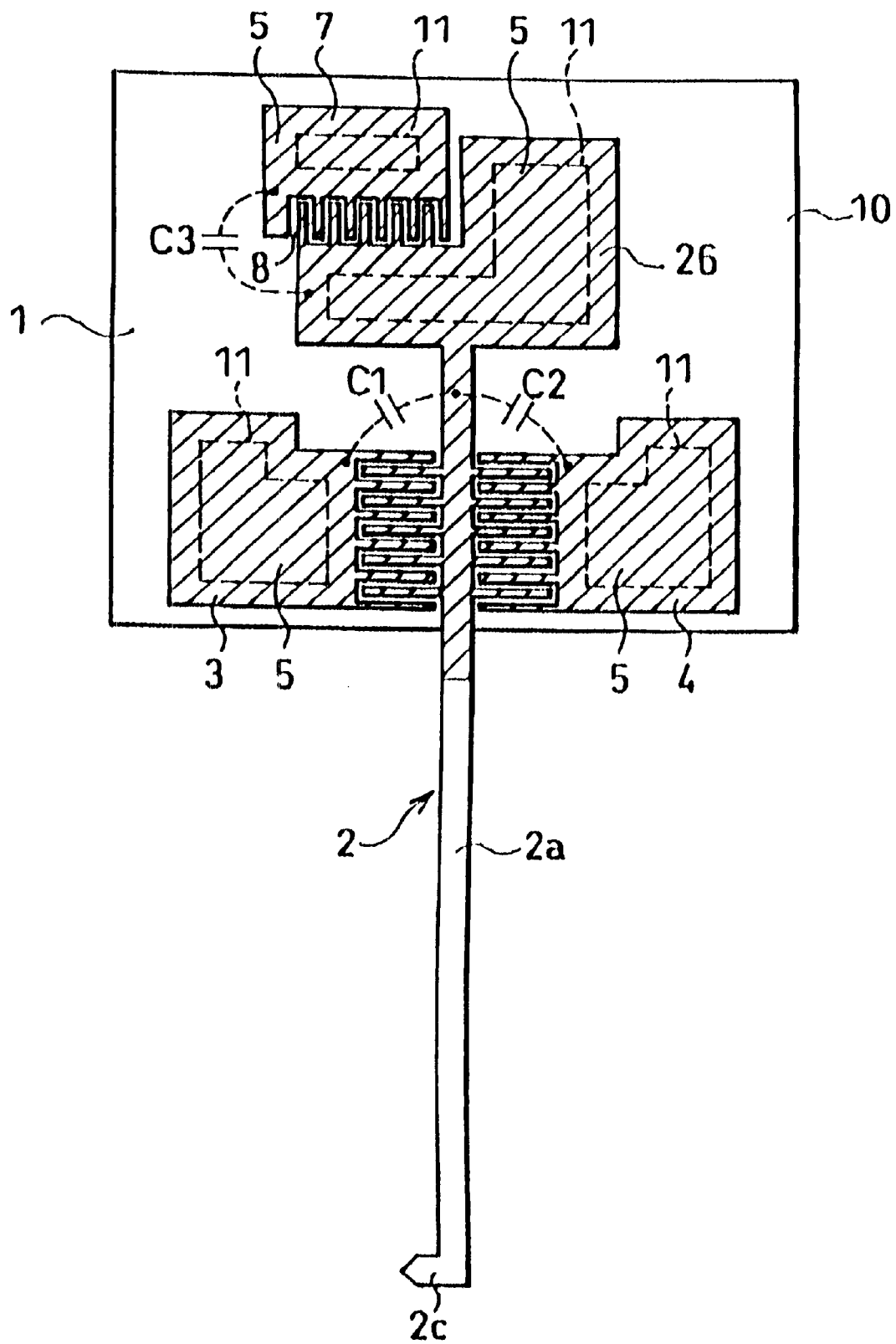
FIG. 6 is a plan view of an alternative of the probe device in FIG. 3.

FIG. 6 shows a further alternative of the arrangement of FIG. 4. In this alternative arrangement, an auxiliary electrode portion 7 is further provided adjacent to the proximal electrode portion 2b for capacitively coupling thereto. The auxiliary electrode portion 7 is formed at the same time as the proximal electrode portion 2b is formed through a process of etching the first silicon substrate 12. At a capacitive coupling portion between the proximal electrode portion 2b and the auxiliary electrode portion 7, an interdigital electrode portion 8 is formed in the form of interdigitating fingers. Others are similar to those in FIG. 4.

The proximal electrode portion 2b capacitively couples to the auxiliary electrode portion 7 through a capacitor C3. The auxiliary electrode portion 7 is employed for the purpose of output stabilization to feed back the demodulated output of the AC signal obtained at the proximal electrode portion 2b when AC-driving the detecting electrode portions 3, 4 as described above.

Figure 7:
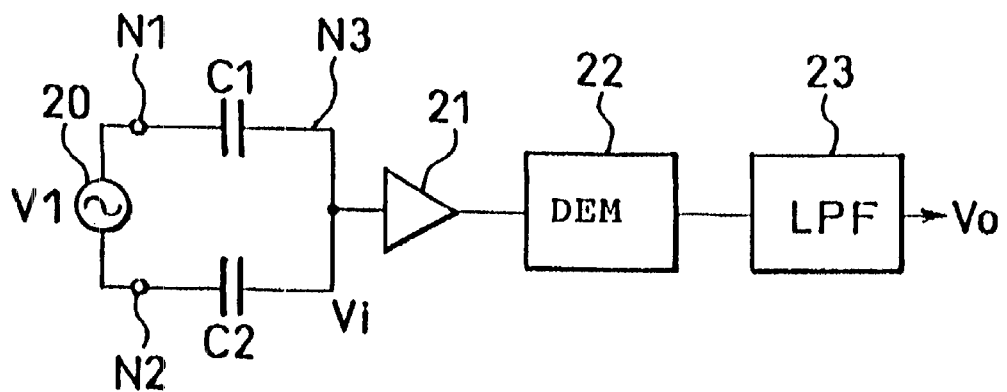
FIG. 7 is an arrangement of a contact measuring circuit using the probe device.

A contact (displacement) measuring circuit can be configured using the probe device according to the present invention as shown in FIG. 7, for example. An AC signal source 20 applies an AC signal V1·sin ωt across terminals N1 and N2 of the capacitors C1 and C2 whose other terminals are commonly connected as a common node N3. The nodes N1 and N2 correspond to the detecting electrodes 3 and 4 and the node N3 the proximal electrode portion 2b. A signal processing circuit is provided on the node N3 to process the output and extract the signal amplitude. The signal processing circuit specifically comprises a preamplifier 21, a demodulator 22 for detecting/demodulating the amplified output and a low pass filer 23 for smoothing and extracting the demodulated output.

The signal amplitude Vi obtained at the common node N3 is represented by the following equation (1):

$$Vi = V1 \cdot (C2-C1)/(C1+C2) \quad (1)$$

When gains of the preamplifier 21, demodulator 22 and low pass filer 23 are respectively denoted by G1, G2 and G3, a DC output Vo obtained from the low pass filter 23 is represented by the following equation (2):

$$Vo = G1 \cdot G2 \cdot G3 \cdot Vi \quad (2)$$

From the equation (1) it can be found that the output amplitude Vi obtained at the common node N3 is equal to zero in a steady state of the probe device at C1=C2. At this moment, the final output Vo is also equal to zero. When the probe contacts a work, the capacitive balance between C1 and C2 is lost, and the AC output with a level represented by the equation (1) is obtained from the common node N3, resulting in the corresponding DC output Vo. Therefore, observation of the DC output Vo leads to contact detection.

A stable output can be obtained from the above contact measuring circuit if it satisfies requirements that the input AC signal is a clear sine wave and that the gains at various parts are known and stable against temperature variations and so forth. It is not always easy to satisfy these requirements. Preferably, a feedback control is then performed to stabilize the measuring circuit.

Figure 8:
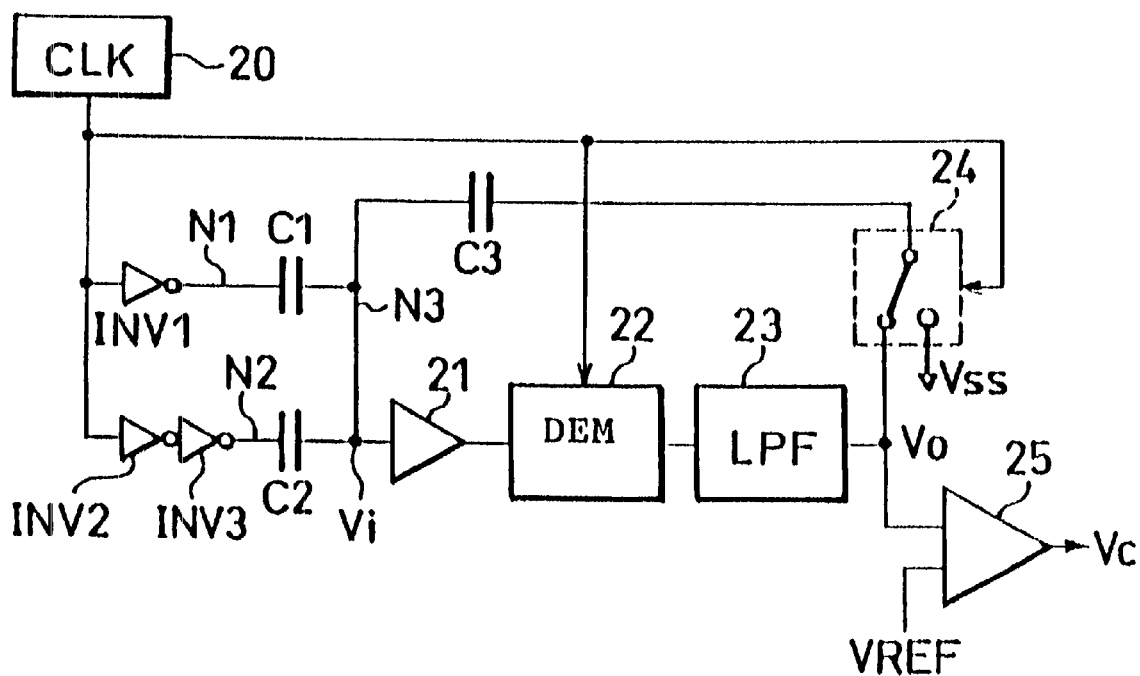
FIG. 8 is another arrangement of a contact measuring circuit using the probe device.

The device structure in FIG. 6 is also effective for such the feedback control system and the capacitor C3 between the proximal electrode portion 2b and the auxiliary electrode portion 7 is employed as a feedback capacitor in an arrangement of a contact measuring circuit as shown in FIG. 8. In this embodiment, an AC signal source 20 is a clock source. A clock signal CLK is supplied to a node N1 of one capacitor C1 through an inverter INV1 and to a node N2 of the other capacitor C2 through two serial inverters INV2, INV3. Thus, the detecting electrode portions 3 and 4 are driven with complementary clock signals.

The common node N3 of the capacitors C1 and C2 is provided with a signal processing circuit that comprises a preamplifier 21, a demodulator 22 and a low pass filer 23 similar to FIG. 7. The demodulator 22 comprises a synchronous detector that is controlled in synchronization with the clock CLK. Preferably, the low pass filter 23 may employ an integrator.

A negative feedback circuit is configured to negatively feed the output Vo from the low pass filer 23 back to the common node N3 (that is the input node of the preamplifier 21) through the capacitor C3. The output Vo is taken out through an analogue switch 24, which is controlled with the clock CLK, at the first half of a clock cycle, and fed as an AC signal alternating between Vo and the ground potential VSS. The DC output Vo is sent to a comparator 25, which provides a compared result with a voltage reference VREF as a detected output Vc.

The measuring circuit with such the feedback control system can be employed to obtain a detected output that is stable against temperature variations. In particular, as shown in FIG. 6, formation of the capacitors C1-C3 on the same device under the same manufacture conditions permits these temperature characteristics to meet with each other and can effectively reduce affection from temperature variations.

In addition, the negative feedback control in the measuring circuit can maintain input/output linearity. From the output Vo of the low pass filter 23, such a value is obtained that corresponds to a degree (that is, displacement) of the deformation of the beam portion 2b of the probe 2 in contact with the work. The comparator 25 can detect outputs above the reference VREF. This prevents erroneous detection from occurring due to device variations and the like and ensures the contact detection.

As obvious from the forgoing, according to the present invention, by processing a stacked substrate with a structure of semiconductor substrate/insulator/semiconductor substrate, a small electrostatic capacitance probe device can be obtained. The principle of the probe contact detection is to detect decomposition of the tip (distortion of the beam portion) of the probe caused from contact with a work to be measured. The decomposition can be detected from a differential capacitance variation between the probe and the pair of the detecting electrodes (that is, between the proximal electrode portion and the pair of the detecting electrodes). A high precise contact detection to be performed without any affection from capacitance variations due to temperature variations and from variations of absolute electrostatic capacitance values due to variable manufacture conditions. Therefore, a small, high-performance probe device optimal for measurement of a micro-bore diameter can be obtained.

Having described the embodiments consistent with the invention, other embodiments and variations consistent with the invention will be apparent to those skilled in the art. Therefore, the invention should not be viewed as limited to the disclosed embodiments but rather should be viewed as limited only by the spirit and scope of the appended claims.

What is claimed is:

1. An electrostatic capacitance probe device formed from a processed, stacked substrate, said stacked substrate including a first semiconductor substrate and a second semiconductor substrate stacked thereon via an insulator, said probe device comprising:

a support substrate formed by etching said first semiconductor substrate to remove undesired portions;

a probe formed by etching said second semiconductor substrate and provided with a proximal electrode portion secured on said support substrate by means of said insulator and a beam portion separated from said support substrate by removing said insulator from beneath said beam portion; and a pair of detecting electrodes formed by etching said second semiconductor substrate, secured on said support substrate by means of said insulator, located to sandwich a part of said beam portion close to said proximal electrode portion, and having sides capacitively coupled with sides of said beam portion, wherein deformation of a tip of said probe caused from contact with a work is detected from a differential capacitance variation between said probe and said pair of detecting electrodes.

2. The electrostatic capacitance probe device according to claim 1, wherein capacitive coupling portions between said pair of detecting electrodes and said beam portion are formed in the form of interdigitating fingers.

3. The electrostatic capacitance probe device according to claim 1, wherein a conductor film is formed over surfaces and sides of said pair of detecting electrodes, said beam portion and said proximal electrode portion.

4. The electrostatic capacitance probe device according to claim 1, further comprising an auxiliary electrode portion formed by etching said second semiconductor substrate, secured on said support substrate by means of said insulator, and having sides capacitively coupled with sides of said proximal electrode portion.

5. The electrostatic capacitance probe device according to claim 4, wherein a capacitive coupling portion between said proximal electrode portion and said auxiliary electrode portion is formed in the form of interdigitating fingers.

6. The electrostatic capacitance probe device according to claim 4, wherein a conductor film is formed over surfaces and sides of said proximal electrode portion and said auxiliary electrode portion.

7. A displacement measuring instrument, comprising:

an electrostatic capacitance probe device according to claim 4;

an alternating signal source for complementarily driving said pair of detecting electrodes;

a signal processing circuit for detecting an amplitude value of a signal appeared on said proximal electrode portion; and a negative feedback circuit for taking an output from said signal processing circuit through an analogue switch in synchronization with said alternating signal source and feeding it to said auxiliary electrode.

8. The displacement measuring instrument according to claim 7, wherein a capacitive coupling portion between said proximal electrode portion and said auxiliary electrode portion is formed in the form of interdigitating fingers.

9. The displacement measuring instrument according to claim 7, wherein a conductor film is formed over surfaces and sides of said proximal electrode portion and said auxiliary electrode portion.

10. A displacement measuring instrument, comprising:

an electrostatic capacitance probe device according to claim 1;

an alternating signal source for complementarily driving said pair of detecting electrodes; and a signal processing circuit for detecting an amplitude value of a signal appeared on said proximal electrode portion.

11. The displacement measuring instrument according to claim 10, wherein capacitive coupling portions between said pair of detecting electrodes and said beam portion are formed in the form of interdigitating fingers.

12. The displacement measuring instrument according to claim 10, wherein a conductor film is formed over surfaces and sides of said pair of detecting electrodes, said beam portion and said proximal electrode portion.

* * * * *